United States Patent
Tanabe (10) Patent No.: US 8,473,188 B2
(45) Date of Patent: Jun. 25, 2013

(54) VEHICLE COLLISION DETECTING SYSTEM

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 1299 days.

(21) Appl. No.: 12/069,578

(22) Filed: Feb. 11, 2008

(65) Prior Publication Data

US 2008/0201077 A1 Aug. 21, 2008

(30) Foreign Application Priority Data

Feb. 20, 2007 (JP) ................................. 2007-039867

(51) Int. Cl.
*G08G 1/16* (2006.01)

(52) U.S. Cl.
USPC ............. 701/301; 701/91; 701/302; 180/274; 293/132; 293/142

(58) Field of Classification Search
None
See application file for complete search history.

(56) References Cited

U.S. PATENT DOCUMENTS

| | | | |
|---|---|---|---|
| 5,440,077 A | | 8/1995 | Konishi et al. |
| 6,212,456 B1* | | 4/2001 | Stride ............................... 701/45 |
| 6,561,301 B1* | | 5/2003 | Hattori et al. ................. 180/274 |
| 6,929,282 B1* | | 8/2005 | Zoratti et al. ................. 280/735 |
| 2004/0144522 A1* | | 7/2004 | Bauer et al. ....................... 165/67 |
| 2005/0021192 A1* | | 1/2005 | Takafuji et al. .................... 701/1 |
| 2005/0104721 A1* | | 5/2005 | Mae et al. ....................... 340/436 |
| 2005/0269805 A1* | | 12/2005 | Kalliske et al. ............. 280/730.1 |
| 2006/0185922 A1* | | 8/2006 | Tanabe ............................ 180/274 |
| 2007/0046044 A1* | | 3/2007 | Tanabe ............................ 293/120 |

FOREIGN PATENT DOCUMENTS

| | | |
|---|---|---|
| DE | 92 15 384 | 3/1994 |
| DE | 42 37 404 | 5/1994 |
| DE | 102 17 031 | 10/2003 |
| JP | 07-035766 | 2/1995 |
| JP | 2005-053273 | 3/2005 |
| JP | 2005-178416 | 7/2005 |
| JP | 2006-232028 | 9/2006 |
| JP | 2007-055482 | 3/2007 |

OTHER PUBLICATIONS

Denso, Pre-Crash Saftey, Copyright 2005 Denson Corporation, http://web.archive.org/web/20060107042108/http://www.globaldensoproducts.com/dcs/pcs/ind x.html.*

Office action dated Jul. 21, 2008 in German Application No. 10 2008 009104.9 with English translation thereof.

* cited by examiner

*Primary Examiner* — Fateh Obaid (74) *Attorney, Agent, or Firm* — Harness, Dickey & Pierce, P.L.C.

(57) ABSTRACT

A collision detecting system includes a bumper reinforcement member, a crush box disposed between the bumper reinforcement member and a fixing member of the vehicle, a strain inducing member fixed to the crush box so as to distort in a longitudinal direction of the vehicle as the crush box is compressed between the reinforcement member and the fixing member and a strain measuring element fixed to the strain inducing member 5. The strain inducing member has a strain measuring portion having such a shape that stress of the strain inducing member concentrates into the strain measuring portion. The strain measuring element is fixed to the strain measuring portion to measure a component of the strain of the strain measuring portion in the longitudinal direction of the vehicle. The strain measuring portion has an asymmetrical cross-section in a vertical direction of the vehicle.

19 Claims, 7 Drawing Sheets

VEHICLE COLLISION DETECTING SYSTEM

CROSS REFERENCE TO RELATED APPLICATION

The present application is based on and claims priority from Japanese Patent Application: 2007-39867, filed Feb. 20, 2007, the contents of which are incorporated herein by reference.

BACKGROUND OF THE INVENTION

1. Field of the Invention

The present invention relates to a collision detecting system for detecting a collision with a pedestrian at a front portion of a vehicle.

2. Description of the Related Art

It has been demanded to protect not only a driver and passengers of a vehicle but also a pedestrian on a road.

In an occupant protection system of a vehicle to meet such a demand, various protection devices for relieving shocks that are caused when a pedestrian collide with a portion of the hood of a vehicle have been proposed. In such a protection system, it is important to provide a collision detecting system for detecting a collision of a vehicle with a pedestrian.

For example, a wire, a strain gauge, an optical fiber, etc. are installed into the front bumper of a vehicle to form a collision detecting system, which detects a collision based on the tension of the wire, the output signal of the optical fiber and the attenuation of light that passes through the optical fiber. However, in order to form such a collision detecting system at a front portion of the vehicle, it is necessary to provide an installation space inside the bumper, which necessitates a substantial work time to install.

Figure 18:
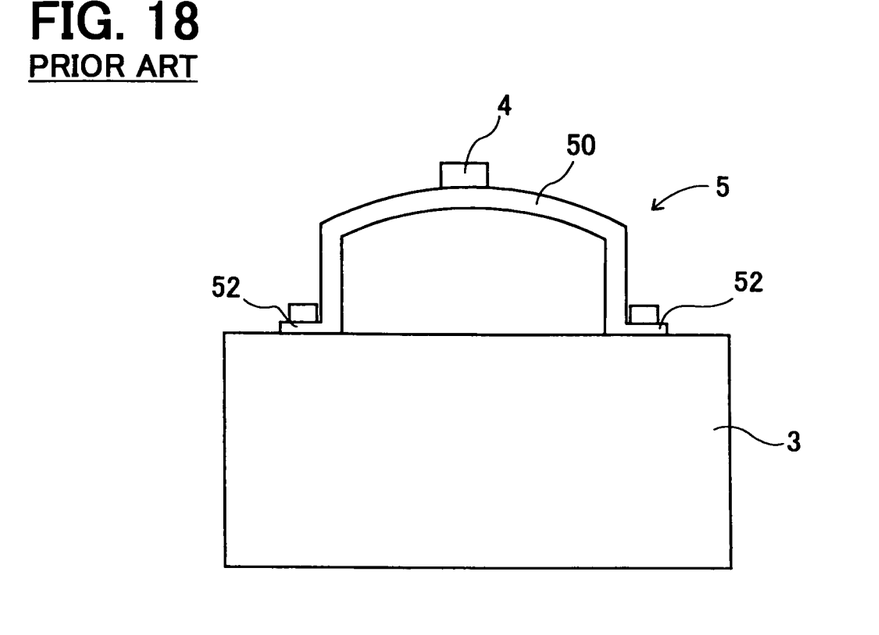
FIG. 18 is a schematic diagram illustrating a strain inducing member of a prior art collision detecting system that swells when a stress is applied thereto.
Figure 19:
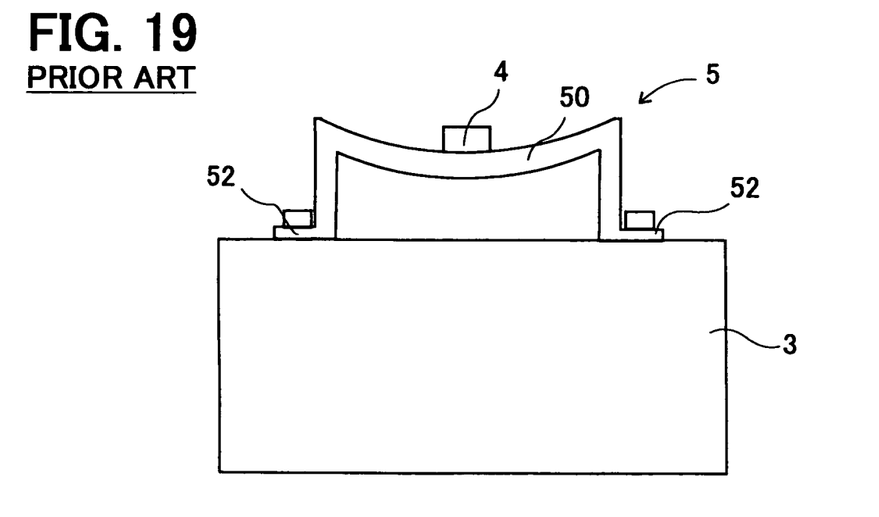
FIG. 19 is a schematic diagram illustrating the strain inducing member of the prior art collision detecting system that dents when a stress is applied thereto.

Another collision detecting system that utilizes a bumper reinforcement member, side members and a crush box, which are existent members of the vehicle, has been proposed. As shown in FIGS. 18 and 19, this collision detecting system includes a strain gauge 4 and a strain inducing member 5 that is distorted according to a strain caused by the side member and the crush box 3 when a portion of the bumper collides with an object. If a strain is generated in the crush box 3, the strain is transmitted to the strain inducing member 50, whose strain is detected by the strain gauge 4.

Normally, the strain inducing member 50 has a flat portion, and a pair of stay portions 52, which are fixed at a preset distance from each other to the crush box 3 by bolts or the like. When a stress is applied to the crush box 3 in a direction such that the preset distance is reduced, the flat portion swells, as shown in FIG. 18 or dents as shown in FIG. 19. The strain gauge 4 generates a positive output signal when the flat portion swells, while the strain gauge 4 generates a negative output signal when the flat portion dents. Therefore, it is difficult to accurately detect what kind of object the vehicle collide with or how sever the collision is.

SUMMARY OF THE INVENTION

In view of the above problem, an object of the invention is to provide a collision detecting system that can accurately detect a collision.

Another object of the invention is to provide a collision detecting system in which a strain gauge provides an output signal of a fixed polarity.

According to a feature of the invention, a strain inducing member in a collision detecting system of a vehicle collision protection system has a strain measuring portion having such a shape that stress of the strain inducing member concentrates into the strain measuring portion to which a strain gauge is fixed to measure a component of the strain of the strain measuring portion in the longitudinal direction of the vehicle, and the strain measuring portion has an asymmetrical cross-section in a vertical direction of the vehicle.

Therefore, the strain measuring portion distorts in a fixed direction, so that the strain gauge can provides a fixed polarity of its output signal.

In the above collision detecting system, the strain measuring portion may have a flat surface on one side and a curved surface on the other side.

The strain inducing member may have a U-shaped cross-section in a longitudinal direction of the vehicle, and the curved surface may have a concave cross-section in a longitudinal direction of the vehicle.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Several preferred embodiments according to the present invention will be described with reference to the appended drawings.

A collision detecting system according to the first embodiment of the invention will be described with reference to FIGS. 1-5.

Figure 1:
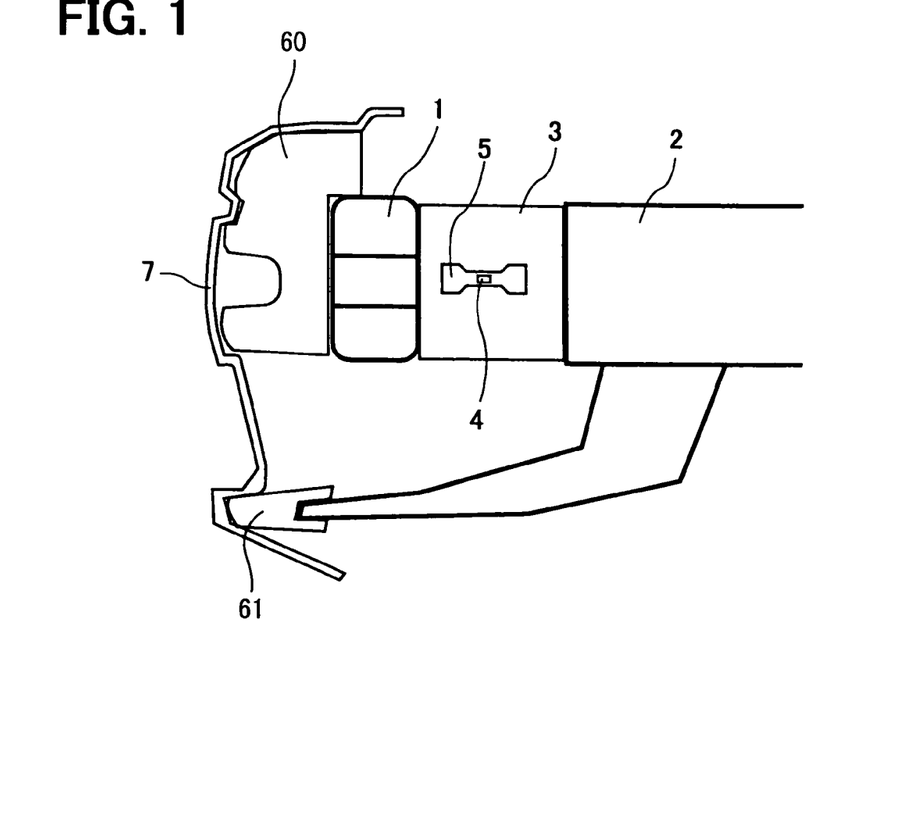
FIG. 1 is a schematic diagram illustrating a collision detecting system according to the first embodiment of the invention is installed.
Figure 2:
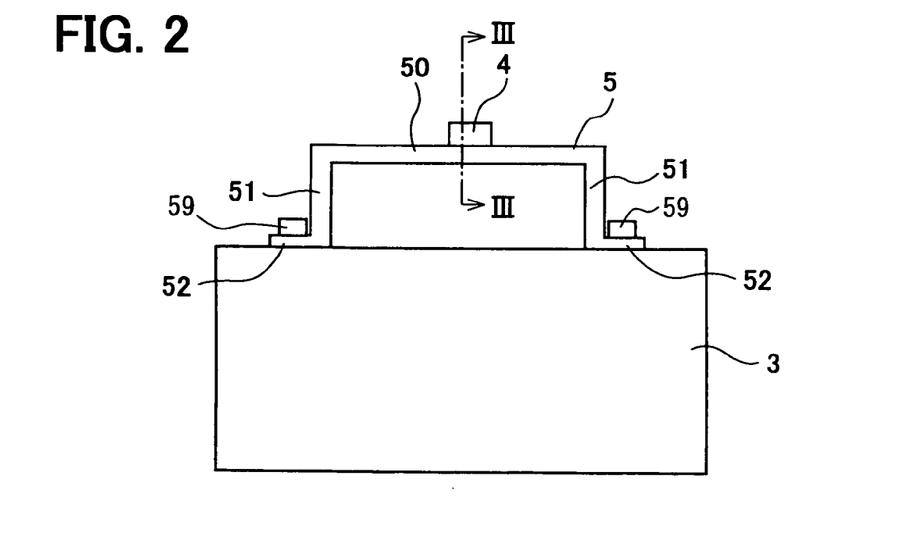
FIG. 2 is a schematic diagram illustrating a portion of the collision detecting system shown in FIG. 1.

As shown in FIGS. 1 and 2, the collision detecting system includes a bumper reinforcement member 1, a pair of side members 2, a crush box 3, a strain gauge 4, a strain inducing member 5, an upper bumper absorber 61, a lower bumper absorber 62, a bumper cover 7 and a data processor (not shown).

The bumper reinforcement member 1 is a long hollow metal pipe that extends in the lateral or width direction of a vehicle to form a part of a frame of the vehicle. The bumper reinforcement member 1 has a pair of beams that partitions the inside thereof into 3 spaces and is fixed to the side members 2 via the crush box 3. The side members 2 are rectangular hollow members that respectively project in front of the engine compartment and extend along the opposite ends of the bumper reinforcement member 1 toward the rear side of the vehicle, forming a part of the frame of the vehicle. The crush box 3 is a long hollow member disposed between the bumper reinforcement member 1 and the side members 2 to absorb energy generated when a front portion of the vehicle collides with an object. The strain gauge 4 is fixed to the strain inducing member 5, which is fixed to the crush box 3, to measure a component of the strain of the strain inducing member 5 in the longitudinal direction of the vehicle. The strain inducing member 5 is made of a metal plate extending in the longitudinal direction of the vehicle. The strain inducing member 5 has a strain measuring portion 50 that has a U-shaped cross section. In other words, the strain inducing member 5 has a longitudinally extending flat bottom and a pair of legs 51 at opposite ends thereof. The strain gauge 4 is fixed to the surface of the strain measuring portion 50 behind the crush box 3 so as to measure a longitudinal component of the strain of the strain measuring portion 50.

As shown in FIG. 1, the strain measuring portion 50 is narrower than the legs 51. The strain inducing member 5 also has stays 52 respectively extending outward in longitudinally opposite directions from the legs 51, so that the strain inducing member 5 is fixed to the crush box 3 by through bolts 59.

Figure 3:
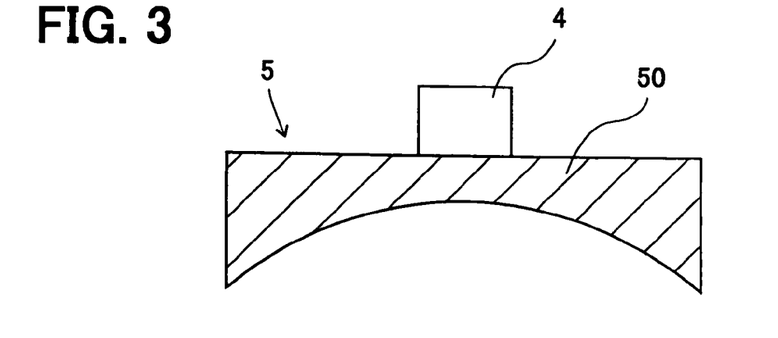
FIG. 3 is a schematic cross-sectional view of a strain inducing member of the collision detecting system according to the first embodiment cut along line III-III in FIG. 2.

As shown in FIG. 3, the strain measuring portion 50 has a concave surface like a concave lens behind the outside flat surface to which the strain gauge is fixed. That is, the strain measuring portion 50 has an asymmetrical cross-section in the vertical direction of the vehicle. Therefore, the strain measuring portion 50 distorts toward the crush box 3 when the crush box 3 is compressed and strains.

The bumper absorber 6 is disposed in front of and along the bumper reinforcement member 1 to absorb shocks caused when the vehicle collides with an object. The bumper absorber 6 is constructed of an upper absorber 60 and a lower absorber 61. The bumper cover 7 covers the bumper absorber 6, so that it can first collide with an object if the vehicle collides with the object. The data processor is connected with the strain gauge 4 and examine if the vehicle collide with an object or not according to the output signal of the strain gauge 4 in a well-known manner.

In operation, when the vehicle collides with an object via bumper cover 7, the bumper absorber 6 is pressed by the object. The bumper absorber 6 absorbs a portion of collision shocks and pushes the bumper reinforcement member 1, which also absorbs a portion of the collision shocks and pushes the crush box 3. Therefore, the crush box 3 distorts in the longitudinal direction of the vehicle.

Figure 4:
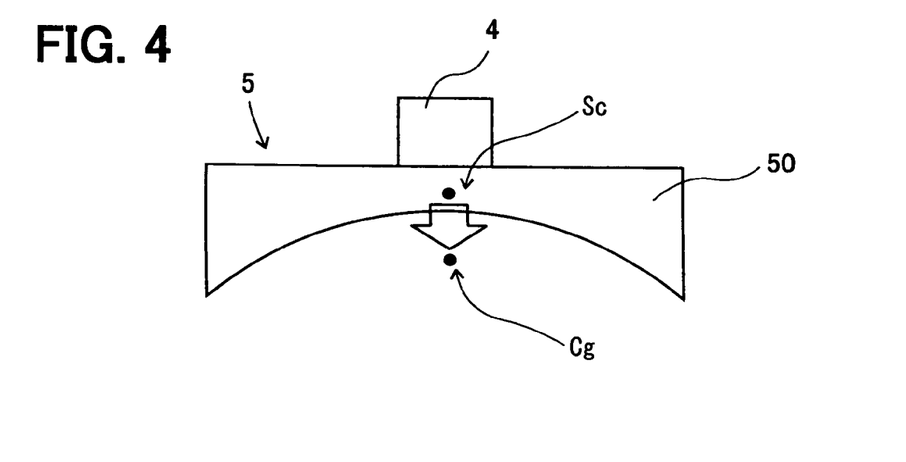
FIG. 4 is a schematic diagram illustrating a characteristic of the strain inducing member of the collision detecting system shown in FIG. 3.

When the crush box 3 distorts, the distance between the stays 52 is reduced to compress the strain inducing member 5 in the longitudinal direction of the vehicle. Therefore, stress is concentrated at a stress concentration portion Sc of the strain measuring portion 50 whose width is narrower than the other portions (e.g. legs 51) of the strain inducing member 5. On the other hand, the center of gravity Cg of the strain measuring portion 50 is located at a position below the concave surface, as shown in FIG. 4. Accordingly, the strain measuring portion 50 distorts so that the stress concentration portion Sc can move toward the center Cg of gravity. In other words, the strain measuring portion 50 moves toward the crush box 3 whenever the vehicle collides with an object. As a result, the strain gauge 4 detects the motion or strain of the strain measuring portion 50 and outputs its signal of the same polarity.

Figure 5:
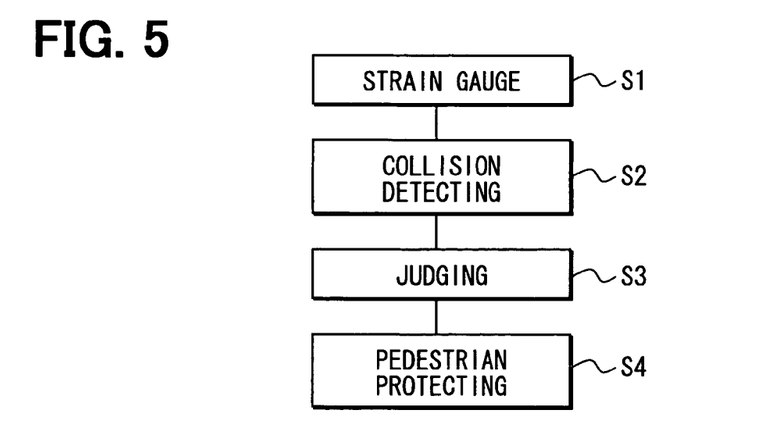
FIG. 5 is a flow diagram showing a process of pedestrian protection.

Then, the output signal of the strain gauge 4 is transmitted to a collision detecting system at S1, as shown in FIG. 5. The collision detecting system examines if a collision takes place or not according to the output signal of the strain gauge 4 at S2.

If the collision detecting system judges that a collision takes place, it further examines whether the object is a pedestrian or not in the following manner at S3. At first, an impacting force is calculated based on the output signal of the strain gauge. Incidentally, the impacting force is a linear function of the output signal of the strain gauge. Then, the mass of the object is calculated based on the impacting force and a vehicle speed (sensed by a vehicle speed sensor). For example, the mass can be calculated from the integral of the impacting force and the vehicle speed. Then, it is judged that the object is a pedestrian if the mass is within a preset range.

In this case, a pedestrian protection system is operated by a startup means at S4. The pedestrian protection system may be a shock relieving system that raises the hood or an air bag system that expands a hood-like air bag when the vehicle collides with a pedestrian.

Figure 6:
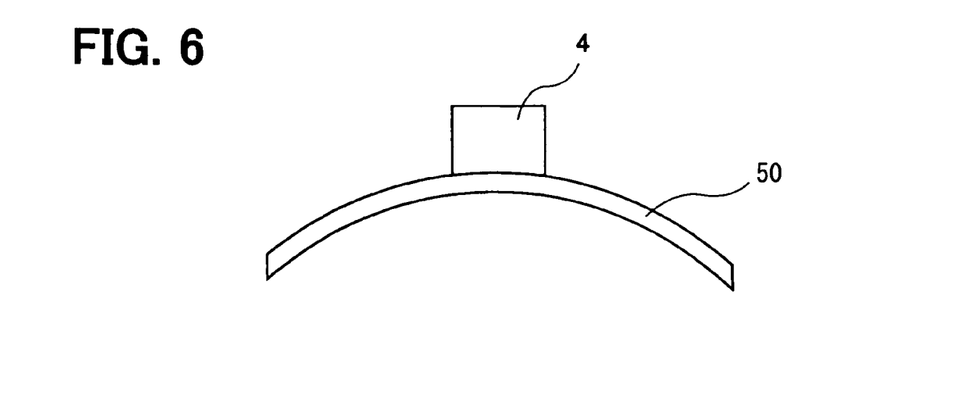
FIG. 6 is a schematic side view of a strain inducing member of the collision detecting system according to the second embodiment of the invention.

A collision detecting system according to the second embodiment of the invention will be described with reference to FIG. 6. Incidentally, the same portion, part or component as the precedent embodiment will be represented by the same reference numeral hereafter.

The strain measuring portion 50 has an outside convex surface instead of the flat surface of strain measuring portion 50 of the strain inducing member 5 of the first embodiment. Therefore, the strain measuring portion 50 of this embodiment also has an asymmetrical cross-section in the vertical direction of the vehicle to distort in the same manner as the strain measuring portion 50 of the first embodiment when the crush box 3 distorts to compress the strain inducing member 5 in the longitudinal direction of the vehicle.

Figure 7:
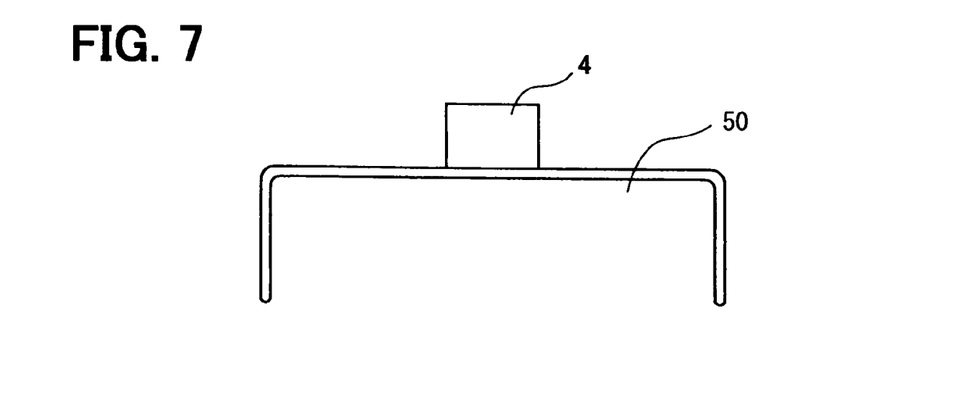
FIG. 7 is a schematic side view of a strain inducing member of a collision detecting system according to the third embodiment of the invention.

A collision detecting system according to the third embodiment of the invention will be described with reference to FIG. 7.

Instead of the arc-shaped cross-section of the strain measuring portion 50 of the second embodiment, the strain measuring portion 50 of the third embodiment has a U-shaped cross-section. Therefore, the strain measuring portion 50 of this embodiment also has an asymmetrical cross-section in the vertical direction of the vehicle to distort in the same manner as the strain measuring portion 50 of the first embodiment when the crush box 3 distorts to compress the strain inducing member 5 in the longitudinal direction of the vehicle.

Figure 8:
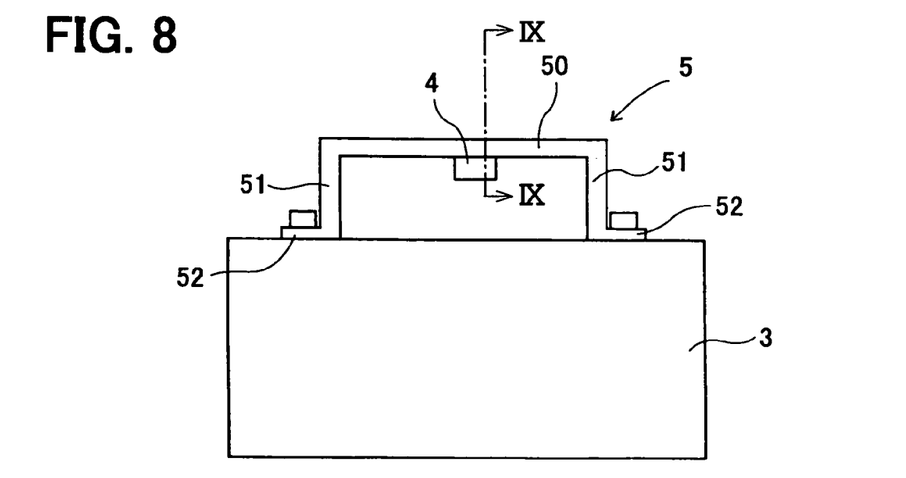
FIG. 8 is a schematic diagram illustrating a portion of a collision detecting system according to the fourth embodiment of the invention.
Figure 9:
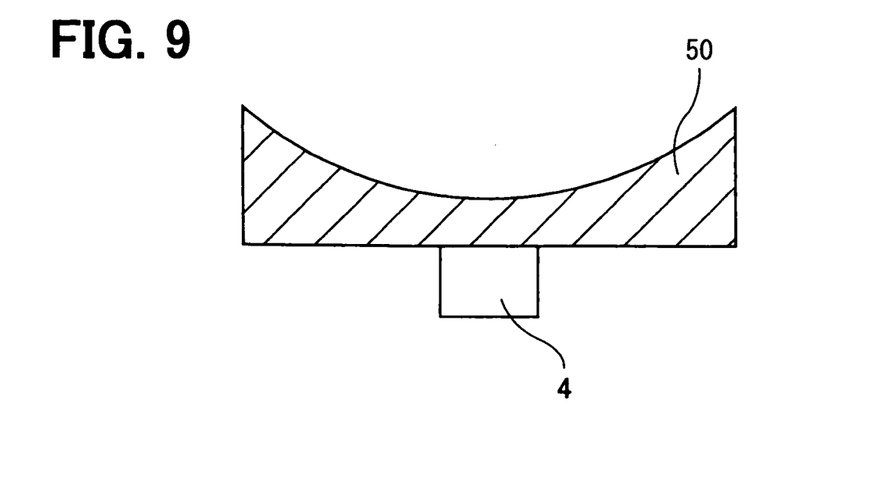
FIG. 9 is a schematic cross-sectional view of a strain inducing member of the collision detecting system according to the fourth embodiment of the invention cut along line IX-IX in FIG. 8.

A collision detecting system according to the fourth embodiment of the invention will be described with reference to FIGS. 8 and 9.

The strain gauge 4 is fixed to the strain measuring portion 50 of the strain inducing member 5 in the same manner as the first embodiment. However, the flat surface is disposed to face the crush box 3. Therefore, the strain measuring portion 50 of this embodiment also has an asymmetrical cross-section in the vertical direction of the vehicle to distort in the direction opposite to the direction in which the strain measuring portion 50 of the first embodiment distorts when the crush box 3 distorts to compress the strain inducing member 5 in the longitudinal direction of the vehicle.

Figure 10:
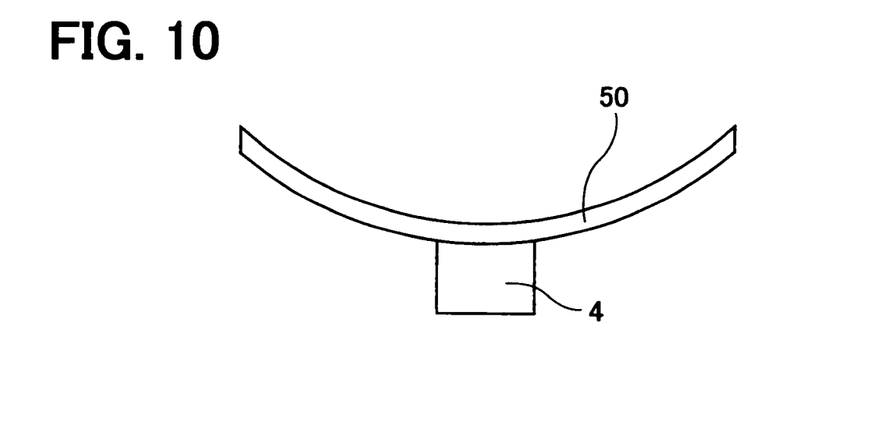
FIG. 10 is a schematic cross-sectional view of a strain inducing member of the collision detecting system according to the fifth embodiment of the invention.

A collision detecting system according to the fifth embodiment of the invention will be described with reference to FIG. 10.

The strain gauge 4 is fixed to the strain measuring portion 50 of the strain inducing member 5 in the same manner as the second embodiment. However, the surface of the strain measuring portion 50 to which the strain gauge 4 is fixed is disposed to face the crush box 3. Therefore, the strain measuring portion 50 of this embodiment also has an asymmetrical cross-section in the vertical direction of the vehicle to distort in the direction opposite to the direction in which the strain measuring portion 50 of the second embodiment distorts when the crush box 3 distorts to compress the strain inducing member 5 in the longitudinal direction of the vehicle.

Figure 11:
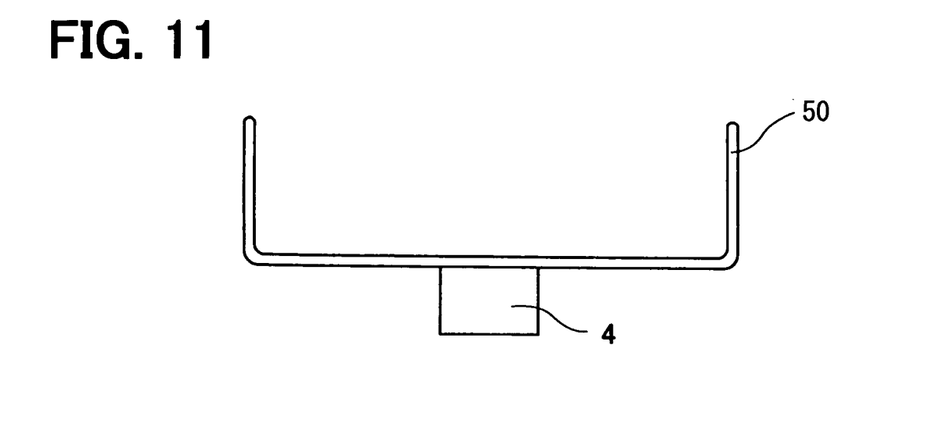
FIG. 11 is a schematic cross-sectional view of a strain inducing member of the collision detecting system according to the sixth embodiment of the invention.

A collision detecting system according to the sixth embodiment of the invention will be described with reference to FIG. 11.

The strain gauge 4 is fixed to the strain measuring portion 50 of the strain inducing member 5 in the same manner as the third embodiment. However, the surface of the strain measuring portion to which the strain gauge 4 is fixed is disposed to face the crush box 3. Therefore, the strain measuring portion 50 of this embodiment also has an asymmetrical cross-section in the vertical direction of the vehicle to distort in the direction opposite to the direction in which the strain measuring portion 50 of the third embodiment distorts when the crush box 3 distorts to compress the strain inducing member 5 in the longitudinal direction of the vehicle.

Figure 12:
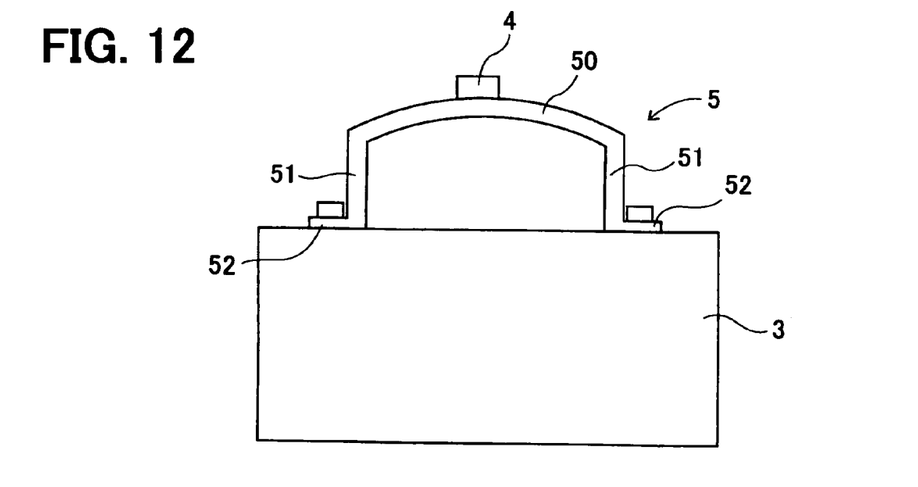
FIG. 12 is a schematic diagram illustrating a portion of a collision detecting system according to the seventh embodiment of the invention.

A collision detecting system according to the seventh embodiment of the invention will be described with reference to FIG. 12.

This collision detecting system is almost the same in construction as the first embodiment except for the strain measuring portion 50 of the strain inducing member 5. The strain measuring portion 50 has an arc-shaped longitudinal cross section with the convex surface thereof facing upward, and the strain gauge 4 is fixed to the convex surface. Therefore, the strain measuring portion 50 of this embodiment also has an asymmetrical cross-section in the vertical direction of the vehicle to distort in the same direction as the direction in which the strain measuring portion 50 of the first embodiment distorts when the crush box 3 distorts to compress the strain inducing member 5 in the longitudinal direction of the vehicle.

Figure 13:
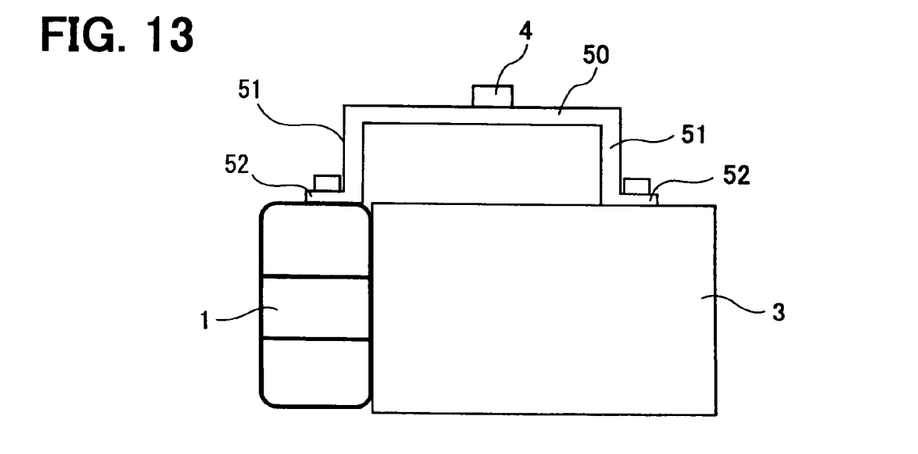
FIG. 13 is a schematic diagram illustrating a portion of a collision detecting system according to the eighth embodiment of the invention.

A collision detecting system according to the eighth embodiment of the invention will be described with reference to FIG. 13.

This collision detecting system is almost the same in construction as the first embodiment except that one of the stays 52 of the strain inducing member 5 is fixed to the crush box 3 and the other is fixed to the reinforcement member 1. Therefore, the strain measuring portion 50 of this embodiment also has an asymmetrical cross-section in the vertical direction of the vehicle to distort in the same direction as the direction in which the strain measuring portion 50 of the first embodiment distorts when the crush box 3 distorts to compress the strain inducing member 5 in the longitudinal direction of the vehicle.

Incidentally, the strain inducing member 5 of this embodiment may be changed to any other strain inducing member that is described above.

Figure 14:
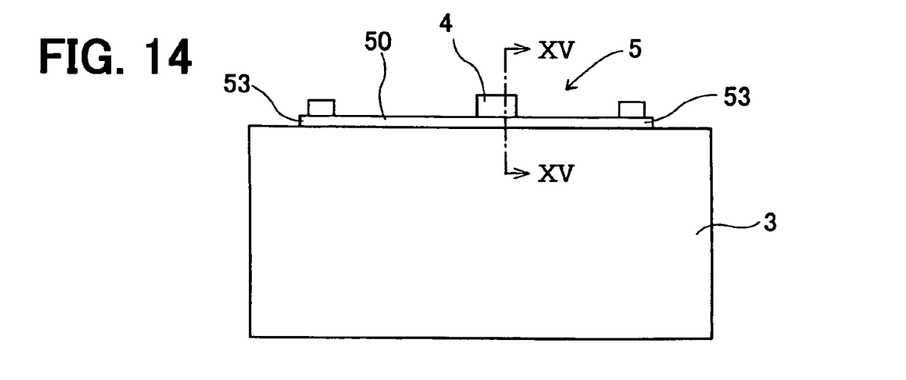
FIG. 14 is a schematic diagram illustrating a portion of a collision detecting system according to the ninth embodiment of the invention.
Figure 15:
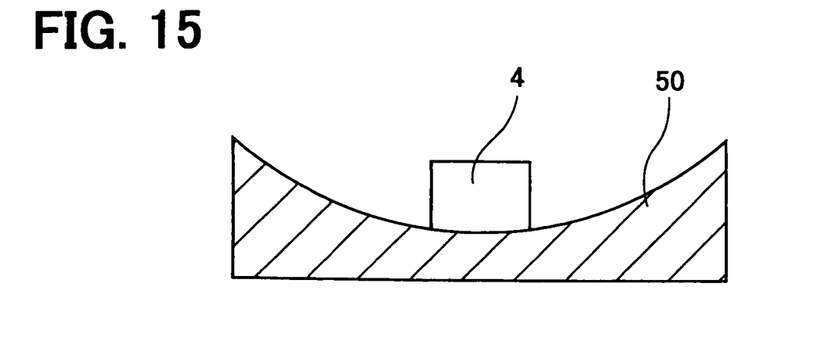
FIG. 15 is a schematic cross-sectional view of a strain inducing member of the collision detecting system according to the ninth embodiment of the invention cut along line XV-XV in FIG. 14.

A collision detecting system according to the ninth embodiment of the invention will be described with reference to FIGS. 14 and 15.

This collision detecting system is almost the same in construction as the first embodiment except for the strain inducing member 5. The strain inducing member 5 of this embodiment is made up of a longitudinally extending flat plate. The strain inducing member 5 has a pair of stays 53 at opposite ends thereof to be fixed to the crush box 3 and a strain measuring portion 50 having a concave to which the strain gauge 4 is fixed. Therefore, the strain measuring portion 50 of this embodiment also has an asymmetrical cross-section in the vertical direction of the vehicle to distort in the outward (upward in FIG. 15) direction whenever the crush box 3 distorts to compress the strain inducing member 5 in the longitudinal direction of the vehicle.

Figure 16:
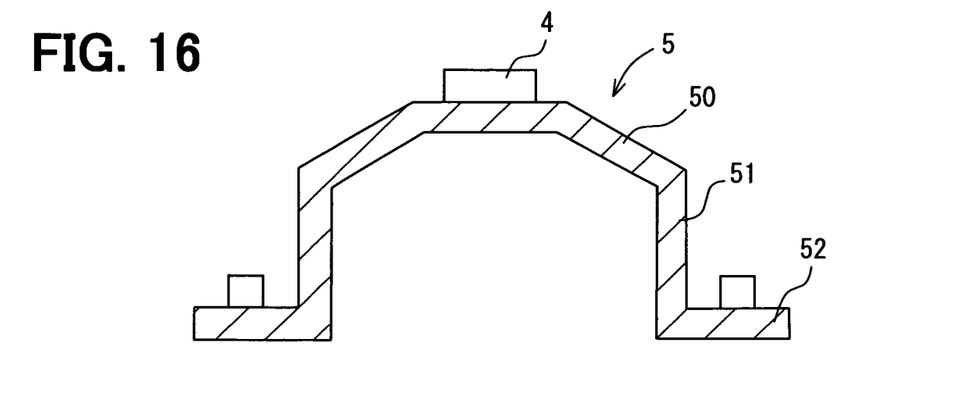
FIG. 16 is a schematic cross-sectional view of a strain inducing member of the collision detecting system according to the tenth embodiment of the invention.

A collision detecting system according to the tenth embodiment of the invention will be described with reference to FIG. 16.

This collision detecting system is almost the same in construction as the seventh embodiment except for the strain measuring portion 50, which has a cross-section of a frustum of pyramid instead of the arc-shaped cross section. Therefore, the strain measuring portion 50 of this embodiment also has an asymmetrical cross-section in the vertical direction of the vehicle to distort in the outward direction whenever the crush box 3 distorts to compress the strain inducing member 5 in the longitudinal direction of the vehicle.

Figure 17:
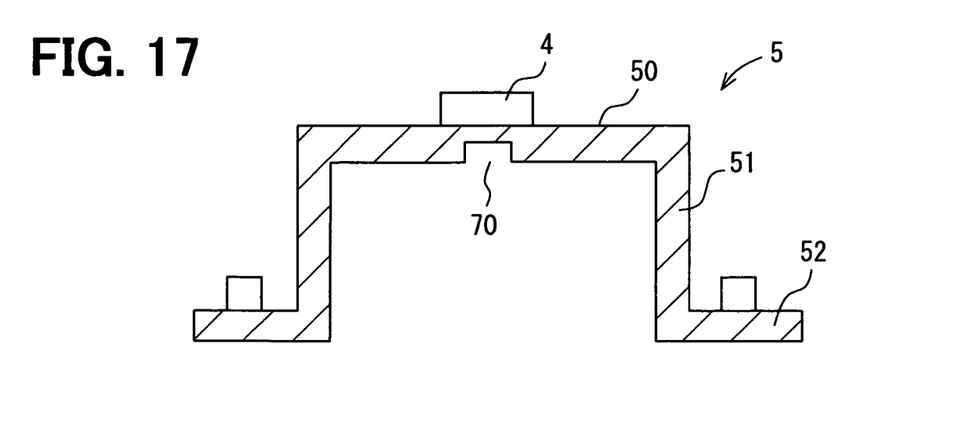
FIG. 17 is a schematic cross-sectional view of a strain inducing member of the collision detecting system according to the eleventh embodiment of the invention.

A collision detecting system according to the eleventh embodiment of the invention will be described with reference to FIG. 17.

This collision detecting system is almost the same in construction as the first embodiment except for the strain measuring portion 50, which has a groove 70 at the surface behind the strain gauge 4. Therefore, the strain measuring portion 50 of this embodiment also has an asymmetrical cross-section in the vertical direction of the vehicle to distort in the outward Cg direction whenever the crush box 3 distorts to compress the strain inducing member 5 in the longitudinal direction of the vehicle.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A collision detecting system of a vehicle collision protection system comprising:
   a bumper reinforcement member,
   a crush box disposed between the bumper reinforcement member and a fixing member of the vehicle,
   a strain inducing member fixed to the crush box so as to distort in a longitudinal direction of the vehicle as the crush box is compressed between the reinforcement member and the fixing member, and
   a strain measuring element fixed to the strain inducing member, wherein:
   the strain inducing member has a strain measuring portion having such a shape that stress of the strain inducing member concentrates into the strain measuring portion;
   the strain measuring element is fixed to the strain measuring portion to measure a component of the strain of the strain measuring portion in the longitudinal direction of the vehicle;
   the strain measuring portion has an asymmetrical cross-section in a vertical direction of the vehicle such that outer and inner surfaces of the strain measuring portion are asymmetrical;
   the inner surface is opposite to the outer surface and faces the crush box;
   one of the outer and inner surfaces of the strain measuring portion is a flat surface and the other of the outer and inner surfaces of the strain measuring portion is a curved surface;
   the curved surface is curved toward the flat surface; and
   the asymmetrical cross-section is taken along a plane perpendicular to the longitudinal direction of the vehicle.

2. The vehicle collision protection system comprising:
   a collision detecting system mounted in a vehicle and constructed according to claim 1;
   a pedestrian protection member for protecting a pedestrian;
   first means for judging the collision by the output signal of the collision detecting system; and
   second means for operating the pedestrian protection member when the first means judges that a collision with a pedestrian takes place.

3. The collision detecting system as in claim 2, wherein the strain inducing member is fixed to a side surface of the crush box and located next to the crush box in a width direction of the vehicle.

4. The collision detecting system as in claim 3, wherein the strain inducing portion is located parallel to the crush box in the width direction of the vehicle.

5. The collision detecting system as in claim 1, wherein the strain inducing member is fixed to a side surface of the crush box and located next to the crush box in a width direction of the vehicle.

6. The collision detecting system as in claim 5, wherein the strain inducing portion is located parallel to the crush box in the width direction of the vehicle.

7. The collision detecting system as in claim 1, wherein the asymmetrical cross-section of the strain measuring portion is asymmetrical with respect to a centerline in the vertical direction of the strain measuring portion.

8. The collision detecting system as in claim 7, wherein the centerline extends in a direction generally parallel with the vertical direction of the vehicle.

9. The collision detecting system as in claim 1, wherein the asymmetrical cross-section of the strain measuring portion is asymmetrical with respect to a centerline in the vertical direction of the strain measuring portion.

10. The collision detecting system as in claim 9, wherein the centerline extends in a direction generally parallel with the vertical direction of the vehicle.

11. A collision detecting system of a vehicle collision protection system comprising
   a bumper reinforcement member,
   a crush box disposed between the bumper reinforcement member and a fixing member of the vehicle,
   a strain inducing member fixed to the crush box so as to distort in a longitudinal direction of the vehicle as the crush box is compressed between the reinforcement member and the fixing member, and
   a strain measuring element fixed to the strain inducing member, wherein:
   the strain inducing member has a strain measuring portion having such a shape that stress of the strain inducing member concentrates into the strain measuring portion;
   the strain measuring element is fixed to the strain measuring portion to measure a component of the strain of the strain measuring portion in the longitudinal direction of the vehicle;
   the strain measuring portion has an asymmetrical cross-section in a vertical direction of the vehicle such that outer and inner surfaces of the strain measuring portion are asymmetrical;
   the inner surface is opposite to the outer surface and faces the crush box;
   both of the outer and inner surfaces of the strain measuring portion are curved in the same direction; and
   the asymmetrical cross-section is taken along a plane perpendicular to the longitudinal direction of the vehicle.

12. The vehicle collision protection system comprising:
   a collision detecting system mounted in a vehicle and constructed according to claim 11;
   a pedestrian protection member for protecting a pedestrian;
   first means for judging the collision by the output signal of the collision detecting system; and
   second means for operating the pedestrian protection member when the first means judges that a collision with a pedestrian takes place.

13. The collision detecting system as in claim 12, wherein the strain inducing member is fixed to a side surface of the crush box and located next to the crush box in a width direction of the vehicle.

14. The collision detecting system as in claim 13, wherein the strain inducing portion is located parallel to the crush box in the width direction of the vehicle.

15. The collision detecting system as in claim 11, wherein the strain inducing member is fixed to a side surface of the crush box and located next to the crush box in a width direction of the vehicle.

16. The collision detecting system as in claim 15, wherein the strain inducing portion is located parallel to the crush box in the width direction of the vehicle.

17. The collision detecting system as in claim 11, wherein the asymmetrical cross-section of the strain measuring portion is asymmetrical with respect to a centerline in the vertical direction of the strain measuring portion.

18. The collision detecting system as in claim 17, wherein the centerline extends in a direction generally parallel with the vertical direction of the vehicle.

19. A collision detecting system of a vehicle collision protection system comprising:

a bumper reinforcement member,
a crush box disposed between the bumper reinforcement member and a fixing member of the vehicle,
a strain inducing member fixed to the crush box so as to distort in a longitudinal direction of the vehicle as the crush box is compressed between the reinforcement member and the fixing member, and
a strain measuring element fixed to the strain inducing member, wherein:
the strain inducing member has a strain measuring portion having such a shape that stress of the strain inducing member concentrates into the strain measuring portion;
the strain measuring element is fixed to the strain measuring portion to measure a component of the strain of the strain measuring portion in the longitudinal direction of the vehicle;
the strain measuring portion has an asymmetrical cross-section in a vertical direction of the vehicle such that outer and inner surfaces of the strain measuring portion are asymmetrical;
the inner surface is opposite to the outer surface and faces the crush box;
one of the outer and inner surfaces of the strain measuring portion is a flat surface and the other of the outer and inner surfaces of the strain measuring portion is a curved surface;
the strain inducing member has a U-shaped cross-section in the longitudinal direction of the vehicle; and
the curved surface has a concave cross-section in the longitudinal direction of the vehicle.

* * * * *